INVENTOR.
ALFRED J. MacINTYRE
BY
ATTORNEY

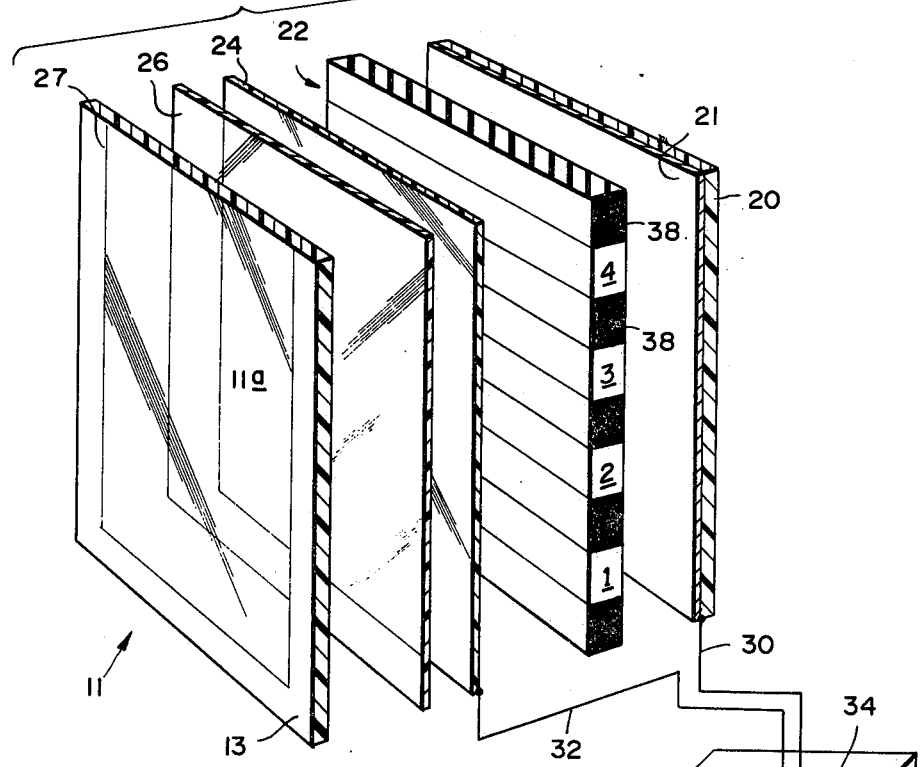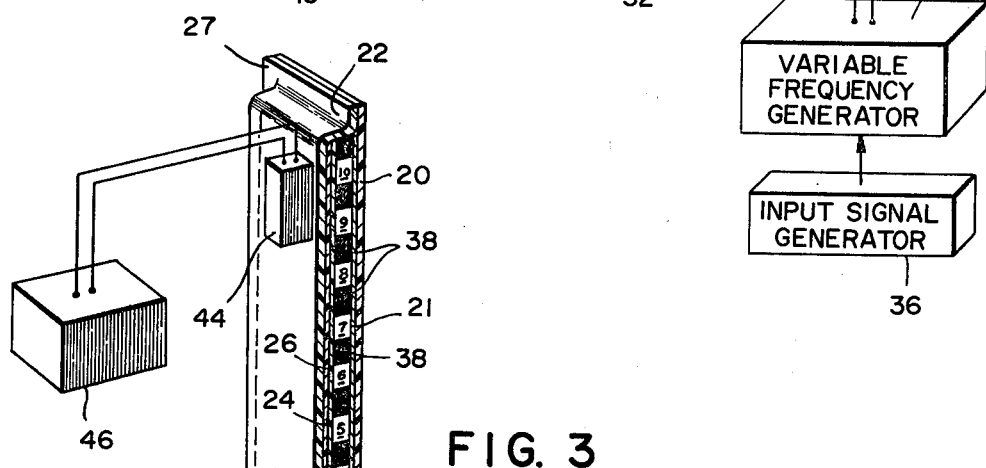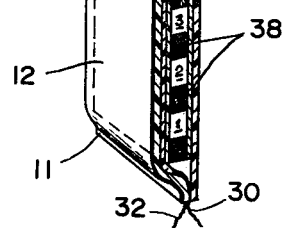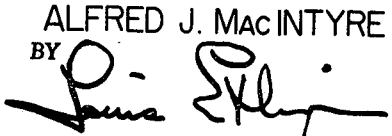

United States Patent Office 3,496,410
Patented Feb. 17, 1970

3,496,410
ELECTROLUMINESCENT DISPLAY DEVICE
PRODUCING A GRAPHICAL DISPLAY IN
A SELECTED COLOR
Alfred J. MacIntyre, Nashua, N.H., assignor to Sanders
Associates, Inc., Nashua, N.H., a corporation of
Delaware
Filed Nov. 13, 1967, Ser. No. 682,284
Int. Cl. H05b 33/00
U.S. Cl. 315—169						14 Claims

ABSTRACT OF THE DISCLOSURE

An electroluminescent display system produces a graphical display in a selected color. It employs a pair of spaced electrodes, one of which is relatively transparent to the selected color, and a plurality of phosphor bodies sandwiched between the two electrodes. Different ones of the phosphor bodies are characterized by their capacity to luminesce in the chosen color when subjected to alternating electric fields having selected different frequencies. An alternating potential is applied across the two electrodes and its frequency is controlled by an input signal to selectively illuminate one or another of the bodies. Preferably, also a filter overlies the transparent electrode to filter out unwanted spectral emissions from the bodies.

BACKGROUND OF THE INVENTION

Field of the invention

This invention relates to an electroluminescent display system in which a lamp or cell containing an electroluminescent phosphor is excited by an electric field. It relates more particularly to an electroluminescent display system capable of displaying moving bars, pointers and the like which, together with associated fixed scales, provide graph-like presentations of a changing parameter value.

The electroluminescent display devices with which we are concerned here have many distinct advantages not found in other conventional display apparatus of a type using cathode ray tube deflection systems and the like. More specifically they are small and light weight, as well as rugged and durable. As such, they have wide application. For example, they may be used in aircraft to provide visual indications of altitude, wind speed and the like.

Description of the prior art

Conventional electroluminescent cells generally comprise a pair of spaced electrodes with one or more layers of field-responsive phosphor material sandwiched between the two electrodes. When an alternating potential is applied between the two electrodes, the resulting electric field excites the phosphor to luminescense. The color of the light emitted from the cell depends primarily upon the makeup of the phosphor.

Using conventional techniques, it is possible to construct an electroluminescent device which provides a graphical presentation of a changing parameter value. In one prior system of which we are aware, a set of separate, similar, small electroluminescent cells are arranged in a line extending parallel to a fixed scale. An input signal, representing the parameter value, is applied selectively to illuminate one or another of the cells. The scale is calibrated so that the illuminated cell is opposite the scale number reflecting the value of the parameter.

While this prior device is an improvement over the conventional cathode ray tube systems, still it is not entirely satisfactory. The main reasons for this are that it requires a separate circuit for each of its cells as well as external switching equipment in order to illuminate only the one cell in the set reflecting the correct parameter value. As a result, the prior systems of this type are relatively complex, and hence costly to make and maintain. Moreover, they are unnecessarily large and bulky.

SUMMARY OF THE INVENTION

Accordingly, this invention seeks to provide an electroluminescent display system which yields an accurate, easily readable visual presentation of a changing parameter value.

A further object of the invention is to provide an electroluminescent display system which gives a graphical display without requiring any external switching equipment.

Another object of the invention is to provide an electroluminescent display system which is relatively easy and inexpensive to manufacture and maintain.

Another object of the invention is to provide an electroluminescent cell for displaying graphs which requires only a single pair of electrodes and connections therefor.

A still further object of the invention is to provide an electroluminescent cell which minimizes false readings due to spurious spectral emissions.

A still further object of the invention is to provide an electroluminescent cell for displaying graphs which comprises a single, small, rugged, durable, self-contained electrical component.

Other objects of the invention will in part be obvious and will in part appear hereinafter.

The invention accordingly comprises the features of construction, combination of elements and arrangement of parts which will be exemplified in the construction hereinafter set forth, and the scope of the invention will be indicated in the claims.

For purposes of illustration, we will describe the invention in connection with a system which yields a bar-graph type of presentation. It should be understood, however, that the same principles may be employed to produce a "moving tape," a moving pointer, or other types of graphical display. Actually, in its broadest aspect, the invention comprises a system for selectively displaying one or more symbols from a fixed repertoire of symbols.

Briefly, the system comprises an electroluminescent cell having a single pair of spaced electrodes, one of which is light-transmitting. A plurality of field-responsive phosphor bodies are sandwiched between the two electrodes. In the case of the bar-graph type of display to be described specifically here, the phosphor bodies take the form of short, horizontal, rectangular bars located in succession along a vertical column. Also, a fixed vertical scale is inscribed on the transparent electrode with each number in the scale being positioned beside one of these bars.

The bars are constructed from a class of so-called color shift phosphors whose color of luminescence changes as the excitation frequency changes, and whose primary spectral peak or color can be predetermined. For example, the light emitted from each bar may vary from yellow through green to blue as the frequency of the excitation field increases over a predetermined range. In this example, green, located midway in the frequency response range, is the primary spectral peak. Also, the phosphor in each bar is selected to luminesce in the predetermined color, e.g. green, when excited by a field having a different selected frequency. In the present case, the phosphors are chosen so that the bars in the column will emit a green light one after the other in ascending order in response to predetermined progressively higher field frequencies.

An alternating potential is applied between the two electrodes. This gives rise to an alternating electric field which is strong enough to excite the bars to luminescence. The field frequency is controlled by an input signal corresponding to the value of the particular parameter which the system is displaying. As this value changes, the field frequency is changed correspondingly causing the bar opposite the scale number representing the actual parameter value to emit a green light. Thus, as the frequency of the excitation field varies over a range including the green emission points of all the bars, each bar, in turn, will emit a green light. As viewed through the light-transmitting electrode, then, an illuminated green bar appears to move up or down the scale.

Preferably, also a wave filter overlies the light-transmitting electrode to eliminate unwanted spectral emissions, i.e., the yellow and blue side bands, from the phosphor bars which occur due to the field frequency variation. The green indicating bar then appears bright against a uniformly dark background.

Thus, the present cell requires only a single pair of electrodes and connections to yield a moving bar type of presentation. Moreover, it needs no external switching circuits. As a result, the device is relatively easy and inexpensive to make as compared with prior comparable electroluminescent lamps used for this purpose. Furthermore, for the same reason, it is more rugged and durable and occupies a minimum amount of space. Thus, the present invention is particularly suited for applications demanding accurate display of information where space and weight are also important factors to be considered. Also, the system may be used as a simple logic or control element, as will be described later in more detail.

BRIEF DESCRIPTION OF THE DRAWINGS

For a fuller understanding of the nature and objects of the invention, reference should be had to the following detailed description taken in connection with the accompanying drawings, in which:

FIG. 2 is an exploded fragmentary perspective view showing the elements of my display system;

FIG. 3 is a vertical section in perspective of my electroluminescent display device also showing its use as a control element.

DESCRIPTION OF THE PREFERRED EMBODIMENT

Figure 1:
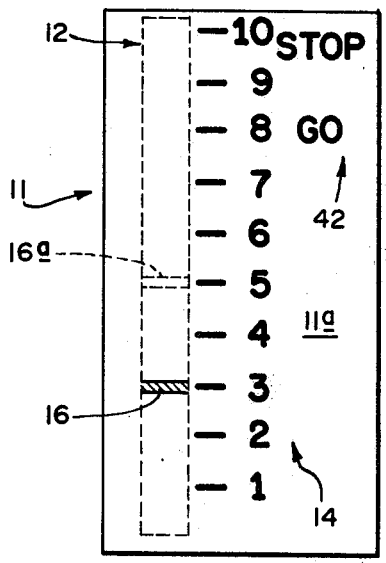
FIG. 1 is a front view of a graphical display made in accordance with this invention.

Referring to FIG. 1 of the drawings, an electroluminescent cell 11 yields a bar-graph type of presentation of a moving parameter value, such as the altitude of an aircraft. The front surface 11a of the cell has an area 12 where the moving portion of the display appears. A fixed scale 14 appears on an opaque area 13 of surface 11a to the right of area 12. Scale 14 is calibrated from 0 to 10, with each number in the scale designating thousands of feet of altitude.

Cell 11 responds to the aircraft's altitude by displaying an illuminated horizontal bar 16 in area 12 adjacent the number in scale 14 corresponding to the actual altitude of the plane, i.e. 3,000 feet in the present example. As the plane changes altitude, the illuminated bar 16 moves up or down correspondingly in area 12. For example, if the plane rises to 5,000 feet, the bar 16 moves up to the dotted line position 16a adjacent "5" in in scale 14.

The area 12 is uniformly dark, except for the altitude-indicating colored bar 16 therein. The color of bar 16 depends primarily upon the composition of the phosphors used in the cell. A color which is easily visible and easy on the eyes is usually chosen. For example, a 5200 A. green emission is suitable.

Referring now to FIGS. 2 and 3, cell 11 comprises several layers of lamina 20, 21, 22, 24, 26 and 27 sandwiched together to form a single, flat, compact electrical component. The thicknesses of these various layers have been greatly exaggerated for clarity.

Proceeding from right to left in FIG. 2, layer 20 is a relatively rigid substrate which supports layer 21 and acts as the supporting base for the cell as a whole. Layer 21, made of copper or other suitable conductive material, functions as one electrode of cell 11. Layer 22 is coextensive with electrode 21 and comprises electroluminescent bars 1 to 10 (FIG. 3) to be described in more detail later. Layer 24 is coextensive with layer 22 and constitutes the second electrode of cell 11. Electrode 24 is electrically conductive as well as relatively transparent to the color selected for the illuminated bar 16 (FIG. 1), i.e. green.

It may consist, for example, of a thin film of transparent plastic coated with tin oxide. Of course, other well-known electrically conductive and light-transmissive materials may be used in lieu of tin oxide to form electrode 24.

Layer 26 is a filter in the form of a film which transmits only the color selected for illuminated bar 16 (FIG. 1), i.e. green. Layer 27 is a transparent film of polyethylene, polvinylchloride, or other strong plastic. It engages over layers 21, 22, 24 and 26 and is bonded to the edges of layers 20, as seen in FIG. 3 to protectively enclose the other elements of the cell. The surface of layer 27 constitutes the surface 11a of the cell as a whole. It is preferably coated to make it opaque except for the portion thereof coinciding with area 12. The scale 14 (FIG. 1) is then printed on the surface of layer 27.

Insulated electrical leads 30 and 32 connected to electrodes 21 and 24, respectively, extend out of cell 11 and are themselves connected to the output terminals of a variable frequency generator 34. Generator 34 develops an alternating potential across electrodes 21 and 24 which produces an alternating electric field through layer 22 which is strong enough to excite one or another of the bars 1 to 10 therein to luminescence.

The frequency of generator 34 is controlled by a signal from an input signal generator 36. In the present example, generator 36 comprises a pressure sensing transducer which emits an electrical signal proportional to the plane's altitude above ground.

Still referring to FIGS. 2 and 3, the electroluminescent bars 1 to 10 in layer 22 are composed of short, horizontal, rectangular areas of phosphor material spaced one above the other in a vertical column. Each bar 1 to 10 is positioned next to the corresponding number in scale 14 (FIG. 1). Bars 1 to 10 are separated by spacers 38 which are made of a dielectric material such as polyvinylchloride acetate to minimize the chance of a short circuit between electrodes 21 and 24. For the same reason, some of the same dielectric material is preferably incorporated into bars 1 to 10 themselves. In practice, the elements of layer 22 may be fabricated together as a thin, self-supporting sheet, as shown in FIG. 2, or they may be deposited as films on one of the adjacent electrodes 21 or 24 prior to sandwiching together the various layers of cell 11.

Each different bar 1 to 10 emits the selected color, i.e. green, in response to a different selected field frequency. Thus, as the plane's altitude changes, the output signal from generator 36 alters the frequency of the signal from generator 34 correspondingly. The signal from generator 34 then causes the bar opposite the scale 14 number reflecting the actual altitude of the plane to emit a green light. If the same signal also excites some of the other bars in layer 22 to luminescence, they will emit light of another wavelength of color.

The bar which is excited to green luminescence shines through light-transmitting electrode 24 and is passed by filter 26 so that it appears as the illuminated bar 16 in area 12 (FIG. 1). However, different wavelength light emitted from other bars is not transmitted by filter 26 so that the rest of area 12 is not illuminated. Consequently, bar 16 stands out next to the number in scale 14 (FIG. 1) giving the plane's altitude. Thus, in the present example of a plane at 3000 feet altitude, the field development generator 34 causes the phosphor in bar 3 to emit the requisite green light producing the illuminated bar 16, opposite scale number "3" in FIG. 1. If any of the remaining bars 1, 2 and 4 to 10 are excited by the field, they emit light having a different wavelength which is not passed by filter 26.

Figure 4:
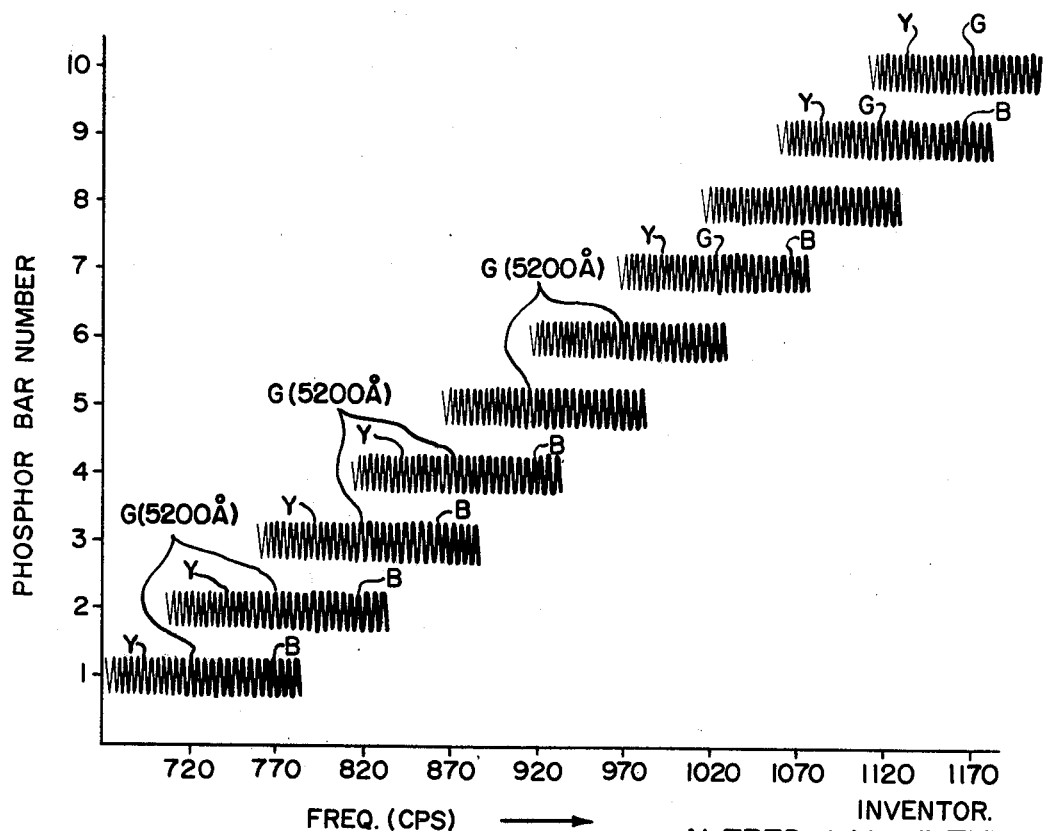
FIG. 4 is a graphical representation illustrating the electroluminescent response with frequency of the various phosphor bars used in the present system.

Referring now to FIGS. 3 and 4, bars 1 to 10 are preferably constructed from a class of field responsive electroluminescent phosphors whose primary spectral peak can be predetermined and whose spectral emission changes wavelength in response to changes in operating frequency. Such phosphors are well-known in the art. The selection of the particular phosphor class will depend on the color desired for the display and the operating frequency range desired for the system. For example, phosphors from the copper and magnesium activated zinc-selenide class will emit 5200 A. green light at the operating frequencies of the present system. The spectral emission from each bar 1 to 10 made from this class of phosphors shifts from yellow through green to blue as the excitation frequency increases over a limited range.

Phosphors having the following compositions have also been found to be satisfactory:

(1) Zn(S:Se):Cu:Cl
(2) Zn(S:Se):Cu:I
(3) Zn(S:Se):Cu:Bn

The above class of phosphors are coactivated. The selection of the halide coactivator affects the spectral distribution of the phosphor. The role of the halide is modified and an association exists between the activator and coactivator. For example in one class of phosphor, the iodide containing phosphor, the spectral shift with increasing Se content is montonic and comparatively uniform with change in composition. However, with chloride or bromide coactivated phosphors the color shifts are nonmontonic and related to the ratio of Se. For example, in a chloride coactivated phosphor the first 10% of Se produces a large color shift. This range of color shift is not renewed until an additional 20–25% of Se is incorporated into the mixture.

Each successive bar 1 to 10 in cell 11 is composed of a phosphor from the selected class which emits the same spectrum, but over a higher frequency range than the phosphor of the preceding bar. More particularly, they are composed of phosphors whose 5200 A. (i.e., green) emissions occur at selection of higher field frequencies. FIG. 4 illustrates the spectral emission shift with frequency of a typical class of phosphors used for bars 1 to 10. Bar 1 emits green (G) light having a wavelength of 5200 A. when excited by a frequency of about 720 c.p.s. As the frequency of the excitation field decreases from this point, the color emitted from bar 1 shifts to yellow (Y), whereas at higher frequencies, it shifts to blue (B). Bar 2 is constructed so that its 5200 A. primary emission point occurs at an operating frequency which is 50 c.p.s. higher than the same emission point of bar 1, i.e., 770 c.p.s. Again, there is a color shift in the emission from bar 2 as the field frequency varies from 770 c.p.s.

In similar fashion, the phosphors of the remaining bars 3 to 10 are selected so that their 5200 A. emission points occur at selectively higher frequencies separated by equal 50 c.p.s. increments.

As seen from FIG. 4, the emission spectra of the various bars 1 to 10 overlap so that the selected green emission point of one bar, say bar 3, may coincide with the blue and yellow emission points of other bars, such as bars 2 and 4, respectively. Filter 26 eliminates these unwanted blue and yellow side bands from the display so as to provide a uniformly dark background for the bar which is selected for illumination. In the absence of the filter, blue or yellow illuminated bars might appear in area 12 above or below illuminated green bar 16 in FIG. 1 and spoil the display.

Filter 26 may be a conventional optical interference film of dichroic construction or it may be a Fabry-Perot interference film or the like. A filter having a peak transmission at 5200 A. of 80%, and a band width of 65 A. has worked satisfactorily. This band width is indicated at 40 on the emission spectrum for bar 3 shown in FIG. 4.

Of course, a different point in the emission spectrum, e.g., blue, may be selected to produce an illuminated bar 16 (FIG. 1) which is blue. In this event, generator 34 would operate at a higher frequency range, e.g., 770–1220 cycles per second. Also, filter 26 would naturally be changed to transmit the wavelength of the selected blue color.

Referring again to FIGS. 1 and 2, while we have specifically illustrated the invention in connection with the graphical display of a changing parameter value, it is equally applicable to display selected symbols from a fixed repertoire or set 42 of symbols. More particularly, transparent windows defining the words "STOP" and "GO" may be formed in the opaque surface 11a. Also, layer 22 may include a phosphor area underlying each of these words. The phosphors in areas are chosen to emit a 5200 A. green light in response to different selected frequencies of excitation. By controlling generator 34 to apply one or the other of the selected frequencies to cell 11, one or the other of these words can be illuminated.

It should be mentioned at this point that cell 11 is only required to produce the moving portion of the display, e.g., the portion appearing in area 12 in FIG. 1. The fixed part of the display, i.e., scale 14, can be produced by conventional means. For example, scale 14 may be inscribed on a face plate having a window of the same size and position as area 12 in FIG. 1. Then a cell made in accordance with this invention may be placed in the window. Alternatively, the fixed portion of the display may be produced by a separate conventional electroluminescent cell whose face is approximately masked to define the scale symbols. In this event, the conventional cell is positioned adjacent cell 11 and controlled by a separate field.

Referring again to FIG. 3, the electroluminescent cell 11 described herein, where coupled with a conventional photoconductor 44, provides a logic or circuit control device. More particularly, photoconductor 44 is arranged to intercept the green light from phosphor bars 9 and 10 in layer 22. Normally, photoconductor 44 presents a relatively high impedance to a relay circuit 46 connected thereto. It is well known that the material composition of a photoconductor can be arranged to respond to a given spectrical emission curve, the lowest impedance point of the material matching a given spectrical emission point of the emitter, in this case the light bar. However, when it intercepts the spectral emissions from bars 9 or 10, its impedance drops. This impedance drop is then used to control relay circuit 46. Circuit 46 may, for example, sound an alarm when photoconductor 44 senses light from bars 9 or 10. This could warn a pilot that his aircraft is nearing its maximum ceiling of 10,000 feet and that he should take corrective action.

By simply extending this concept, several photoconductors 44 can be coupled with the cell to respond to selected ones of bars 1 to 10. In this way, the system can perform control or coding functions as the input signal from generator 36 varies illuminating one or another of the bars.

Thus, it will be appreciated from the foregoing that my electroluminescent display system employing color shift phosphors and a filter film overlay provides a reliable and relatively inexpensive means for displaying graphically moving parameter values as well as displaying selected symbols from a set. The device is simple and relatively economical to manufacture because it uses only a single pair of electrodes and connections therefor. Moreover, it requires no external switching circuitry to illuminate one or another of the elements of the cell. Finally, the present cell is rugged and durable and particularly suited for applications where size and weight are important factors to be considered.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of invention which, as a matter of language, might be said to fall therebetween.

I claim:

1. An electroluminescent display system comprising
   (A) a set of phosphor bodies which electroluminesce in the presence of an alternating electric field, said said bodies being selected so that different ones thereof emit light having the same selected wavelength at different predetermined field frequencies;
   (B) means for subjecting said bodies to an alternating electric field; and
   (C) means for varying the frequency of said field between said predetermined frequencies so as to selectively excite one or another of said bodies to luminesce at said selected wavelength.

2. An electroluminescent display system as defined in claim 1 and further including a wave filter associated with said bodies, said filter only transmitting light having said selected wavelength.

3. An electroluminescent display system as defined in claim 1
   (A) wherein said varying means
       (1) responds to an input signal representing a changing parameter value; and
       (2) controls the frequency of said field in response to said input signal so as to excite a selected one of said bodies; and
   (B) further includes a scale associated with said set, said selected one of said bodies designates the actual value of the parameter on said scale.

4. An electroluminescent display system as defined in claim 1 and further including means for sensing light having said selected wavelength emitted from one or more of said bodies, said sensing means emitting a control signal in response thereto.

5. An electroluminescent display system comprising
   (A) an array of phosphor bodies defining a set of symbols, different ones of said symbols being adapted to emit the same color light when excited by an alternating electric field having different selected frequencies;
   (B) means for subjecting all of said bodies simultaneously to an alternating electric field; and
   (C) means for controlling the frequency of said field so as to excite those of said bodies corresponding to selected symbols from said set so that they emit said same color light.

6. An electroluminescent display system as defined in claim 5 wherein
   (A) some of said bodies
       (1) define a set of bars;
       (2) are associated with a fixed scale; and
       (3) emit said same color light in response to a succession of different predetermined field frequencies;
   (B) said control means includes means responsive to an input signal representing a changing parameter value, so that as said value increases or decreases said control means applies said predetermined field frequencies in succession to said bodies.

7. An electroluminescent display system as defined in claim 5 and further including a filter positioned to intercept the emissions from said bodies, said filter transmitting only said some color light.

8. An electroluminescent display system as defined in claim 7 wherein said filter comprises an optical interference film of dichroic construction.

9. An electroluminescent display system as defined in claim 5 wherein each of said bodies comprises zinc sulfide activated with copper and magnesium in different proportions than in the remaining bodies.

10. An electroluminescent display system as defined in claim 5 wherein each of said bodies comprises zinc sulfo selenide activated with copper and magnesium in different proportions than in the remaining bodies.

11. An electroluminescent display system as defined in claim 5 wherein each of said bodies comprises zinc sulfo selenide coactivated with a material selected from the group consisting of chloride, bromide and iodide in different proportions than the remaining bodies.

12. An electroluminescent display system as defined in claim 5 and further including a photoconductor positioned to detect said same color light from one or more of said bodies, said photoconductor emitting control signals in response thereto.

13. An electroluminescent cell for producing a graphical display in a selected color comprising
   (A) a pair of spaced electrodes, one of said electrodes being relatively transparent to said selected color;
   (B) a plurality of electroluminescent phosphor bodies sandwiched between said electrodes, different ones of said bodies being characterized by their capacity to electroluminesce in said selected color when subjected to alternating electric fields having preselected different frequencies; and
   (C) means for applying an alternating potential between said electrodes whose frequency is variable between said preselected frequencies so as to selectively excite one or another of said bodies so that it emits said selected color.

14. An electroluminescent display device as defined in claim 13 and further including a filter overlying said transparent electrode, said filter transmitting only said selected color.

References Cited

UNITED STATES PATENTS

| | | | |
|---|---|---|---|
| 2,286,634 | 6/1942 | McCauley | 313—108 |
| 3,153,739 | 10/1964 | De Graffenried | 313—108 |
| 3,118,079 | 1/1964 | Lehmann | 315—169 |

OTHER REFERENCES

I. A. Fowler: "A Luminescent Infrared Spectroscope," IBM Technical Disclosure Bulletin, vol. 5, No. 12, May 1963, pp. 73–74.

JAMES W. LAWRENCE, Primary Examiner

DAVID O'REILLY, Assistant Examiner

U.S. Cl. X.R.

313—108